United States Patent [19]

Houskamp et al.

[11] 4,034,823

[45] July 12, 1977

[54] MANUAL REVERSE CONTROL FOR A MANUALLY OPERABLE AUTOMATICALLY CONTROLLED VEHICLE

[75] Inventors: Robert W. Houskamp, Grand Rapids; Thomas E. Hainsworth, Alto, both of Mich.

[73] Assignee: Lear Siegler, Inc., Santa Monica, Calif.

[21] Appl. No.: 637,196

[22] Filed: Dec. 3, 1975

[51] Int. Cl.² ........................................ B62D 51/04
[52] U.S. Cl. .................................. 180/98; 180/77 H
[58] Field of Search ........... 180/96, 94, 77 R, 77 S, 180/98, 79.1, 65 R; 104/151; 318/280, 282, 256, 264, 446

[56] References Cited

U.S. PATENT DOCUMENTS

| | | | |
|---|---|---|---|
| 2,920,713 | 1/1960 | Paradise | 293/4 X |
| 3,375,740 | 4/1968 | Bottum | 180/77 R X |
| 3,557,893 | 1/1971 | Kohls | 180/79.1 X |

Primary Examiner—Joseph F. Peters, Jr.
Assistant Examiner—R. Schrecengost
Attorney, Agent, or Firm—McGarry & Waters

[57] ABSTRACT

A vehicle which is automatically driven and steered on a predetermined guide path and which has a manual control behind a front door and/or operable by rotating a tiller from a vertical to a horizontal position has a reverse control with an exteriorly located actuating means for driving the vehicle in a reverse direction when the other manual controls are inaccessible. The reverse control overrides both the manual control as well as the automatic control for the vehicle.

18 Claims, 4 Drawing Figures

MANUAL REVERSE CONTROL FOR A MANUALLY OPERABLE AUTOMATICALLY CONTROLLED VEHICLE

BACKGROUND OF THE INVENTION

1. Field of the Invention

This invention relates to a manual reverse control for a manually operable automatically controlled vehicle. In one of its aspects, the invention relates to a means for manually driving an automatically controlled vehicle in a reverse direction when other manual controls at the front of the vehicle are inaccessible due to the presence of an obstacle abutting the front of the vehicle.

2. State of the Prior Art

Various service vehicles have been provided with automatic controls so that they are driven on a predetermined guide path in a programmed manner. In such vehicles, the guide paths, such as reflected guidelines or electrically detectable guide wires, are positioned on or in the floor. For example, in U.S. Pat. No. 3,628,624 to Wesener, issued Dec. 21, 1971, a vehicle which follows a predetermined guide path has a control panel at the front end of the vehicle for presetting a reader to respond to code markings along the guide path. A reversing switch is provided on a control panel to reverse the functions of the automatic guide system so that the vehicle follows the guide path in a reverse direction.

An automatically controlled vehicle with a manual override is disclosed in the U.S. Pat. to Kohls, No. 3,557,893, issued Jan. 26, 1971. In the Kohls vehicle, a tiller, pivotably mounted on a vertical steering shaft, is biased to a normally inoperative vertical position. Movement of the tiller downwardly to an operative position deactivates the automatic steering system, disconnects the steering servomotor, and activates a control unit operated by a handle on the tiller for propulsion regulation and steering of the vehicle.

The tiller control system provides a convenient method of manually steering the vehicle while manually controlling the propulsion of the vehicle. The disadvantage to this system is that the tiller handle must be pulled down forwardly of the vehicle in order to activate the manual control system. In the event that an obstacle such as a wall is struck by the front of the vehicle, it may not be possible to pull the tiller down so that the manual control can be used to operate the vehicle. In such cases, the vehicle must be pushed backward manually or lifted backwardly a distance sufficient to operate the tiller handle. If the brakes of the vehicle have been applied, lifting may be the only way to position the vehicle back from the obstacle in order to achieve the manual controls.

In certain types of uses for automatically controlled vehicles, it is desired to place the tiller or other manual controls behind a front door. Removal or pivoting of the door to reach the manual controls is equally difficult if the front of the vehicle is abutting an obstacle.

SUMMARY OF THE INVENTION

According to the invention, an automatically controlled vehicle has a reverse control means, including a manually operable means positioned at an exterior location on the vehicle, coupled with a drive means for the vehicle to drive the vehicle in a reverse direction upon actuation of the exteriorally located actuating means. The vehicle has a manual control means positioned at a front of the vehicle, desirably behind a front door of the vehicle, and desirably of the type which includes a pivotably mounted tiller handle.

Typically, the manual control means is connected to a steerable wheel for the vehicle so that the vehicle may be manually steered. The manual control means further includes means for controlling a drive means for the vehicle for manually controlling the propulsion of the vehicle.

The reverse control means desirably includes means for overriding the automatic control means for the vehicle and further includes means for overriding the manual control means of the vehicle.

Thus, by the invention, the vehicle is provided with a means for moving the vehicle back from an obstacle which it may have struck in order to provide access to manual controls which are positioned behind a front door and/or operable by rotating a tiller handle downwardly.

In a preferred embodiment of the invention, the reverse control actuating means are positioned at the rear portion of the vehicle. Further, in a preferred embodiment of the invention, a switch is actuatable by the opening of a front door, the switch being coupled to the automatic control means for the vehicle to override the automatic control when the door is open.

BRIEF DESCRIPTION OF THE DRAWINGS

The invention will now be described with reference to the accompanying drawings in which.

DESCRIPTION OF THE PREFERRED EMBODIMENT

Figure 1:
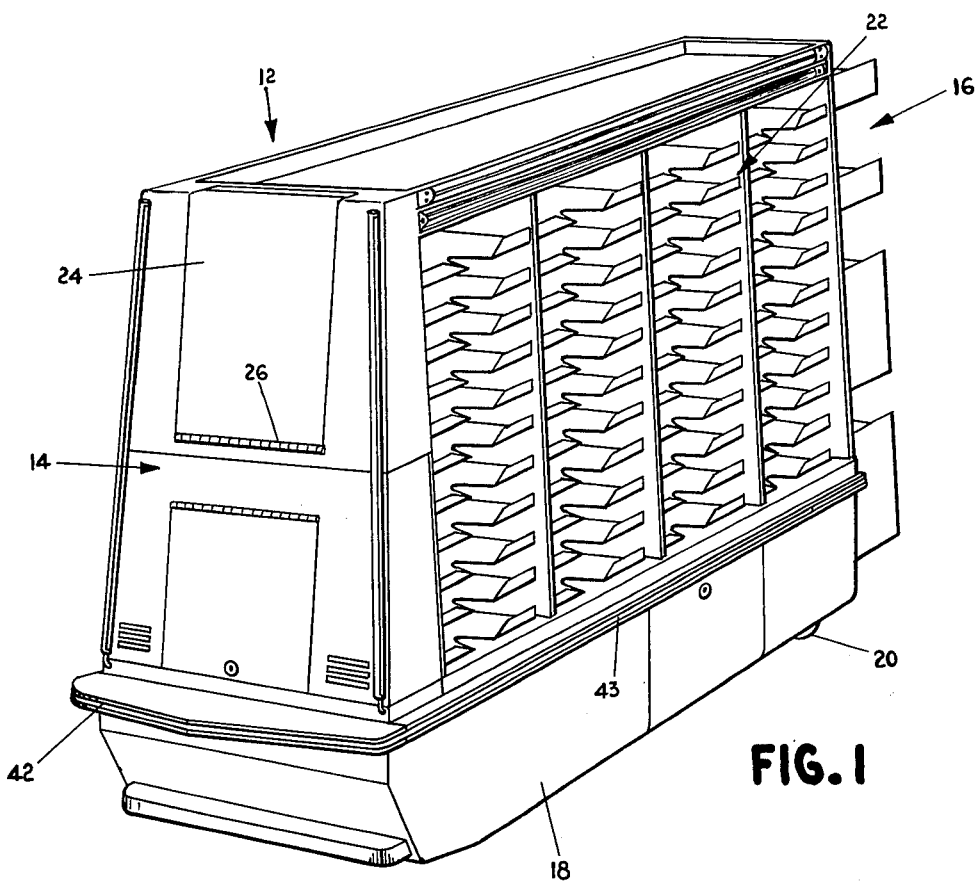
FIG. 1 is a perspective view of a vehicle embodying the emergency reverse switch according to the invention.
Figure 2:
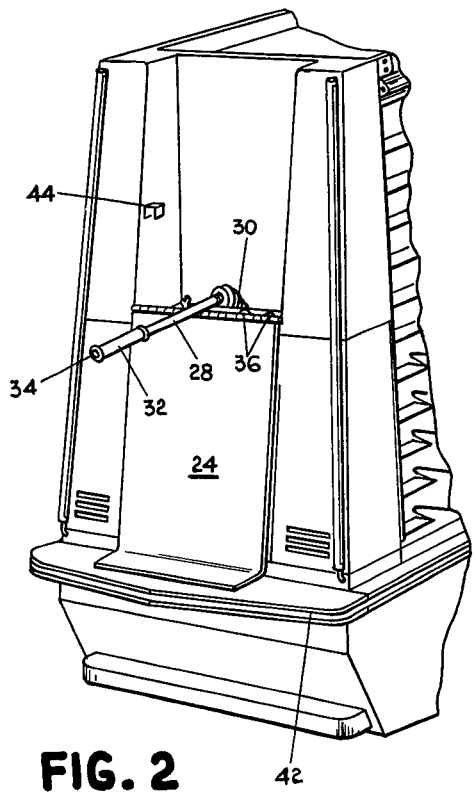
FIG. 2 is a perspective view of the front portion of the vehicle illustrated in FIG. 1 with a front door open.
Figure 3:
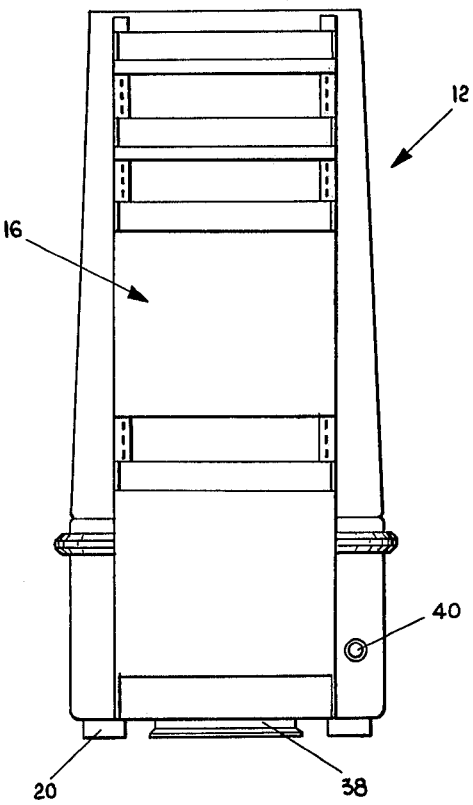
FIG. 3 is a rear view of the vehicle illustrated in FIGS. 1 and 2.

Referring now to the drawings, and to FIGS. 1 through 3 in particular, there is shown a delivery vehicle 12 for delivering mail, for example. The vehicle has a front end 14, a back end 16 and sides 18. Rear wheels 20 and a single steerable and driven wheel (not shown in FIGS. 1–3) at the front of the vehicle, support the vehicle for movement along a surface. The vehicle has a plurality of mail shelves 22 in which various items may be placed for delivery by the vehicle.

Normally, the vehicle will track an invisible line, such as a line containing a fluorescent material, and has a tracking system as, for example, which is disclosed and claimed in commonly assigned U.S. patent application of Jack A. Cooper and Carl DeBruine, Ser. No. 489,043, filed July 16, 1974, and entitled VEHICLECONTROL MECHANISM, now U.S. Pat. No. 3,935,922. This application is incorporated herein by reference. The vehicle thus normally follows a predetermined path automatically and is programmed to stop for timed intervals at preselected locations responsive to coded signals in the floor. After the timed stops, the vehicle will then continue along the preselected path until it comes to another stopping place. The automatic control features of the vehicle and the program control form no part of this invention.

Occasionally, it is desirable to disable the automatic control and to operate the vehicle manually. For this purpose, a door 24 is provided at the front of the vehicle on hinge 26. The front door has a normally closed switch 44 which disengages the automatic control for the vehicle as the door is opened in a manner which will be described later so that the vehicle can be manually operated. The switch actuator contacts the door to maintain the switch open so long as the door is closed.

As illustrated in FIG. 2, the front door 24 rotates downwardly on hinge 26 to expose a pivotably mounted tiller handle 28. The handle 28 is pivotably mounted on hinge coupling 30 to a central shaft (not shown) for steering the vehicle steerable wheel. The handle 28 is biased in a vertically upright position. The handle 28 is connected to the front steerable wheel through means (not shown) so that when the tiller is pulled downwardly as illustrated in FIG. 2, it can steer the front wheel.

A handle control 32 with a speed control button 34 is provided at the outer end of the handle 28. Additional controls 36 are provided inside the front door 24 for starting and stopping the vehicle as desired. Controls are provided in the handle control 21 such that when the handle control is pulled forwardly, the cart will be driven in a forward direction. Alternately, when the handle control 32 is pushed toward the vehicle, the vehicle is driven rearwardly. The speed button control causes the vehicle to be driven at a higher speed when the button is depressed.

As illustrated in FIG. 3, a tracking unit 38 is provided beneath the vehicle for tracking the invisible line and for automatically guiding the direction of the vehicle. The tracking unit 38 also detects coded control signals to control the stopping of the vehicle.

The vehicle 12 has a front bumper 42 and a side bumper 43 which contains a pressure sensitive switch for stopping the vehicle when the vehicle contacts an abutment. The pressure sensitive switch (not shown) in the bumper disables the automatic control for the delivery vehicle and causes the same to stop.

Occasionally, the vehicle may encounter an obstacle such as a vertical wall which prevents opening of the door 24. Alternatively, the cart may come in contact with an obstacle which is in contact with the door 24 in the closed position illustrated in FIG. 1 so that the door 24 cannot be opened. In this condition, the vehicle cannot be reversed manually by the controls at the front since the door cannot be opened and the tiller handle 28 cannot be pulled downwardly as illustrated in FIG. 2. It is thus necessary to back the vehicle away from the obstacle so that the door can be opened and the tiller handle can be pulled downwardly. In order to back the vehicle with the tiller handle, the vehicle must be lifted or manually pushed away from the wall. Since these vehicles are quite heavy, it is very difficult to lift the vehicle or otherwise push the vehicle away from the obstacle.

According to the invention, an emergency reverse button 40 is provided at a rear position of the vehicle, preferably at a lower rear portion as illustrated in FIG. 3. The button can be in any location which is accessible when an obstacle is abutting the front door of the vehicle. The emergency reverse button 40 is connected to a switch which overrides the manual control for the vehicle and operates the motor to drive the front driven wheel in a reverse direction. The button 40 is spring biased outwardly so that the vehicle is driven in a reverse direction only so long as the button is held in a depressed condition. Thus, when the vehicle hits an obstacle which prevents opening of the front door, the emergency reverse button 40 is depressed in order to drive the vehicle in a reverse direction.

Figure 4:
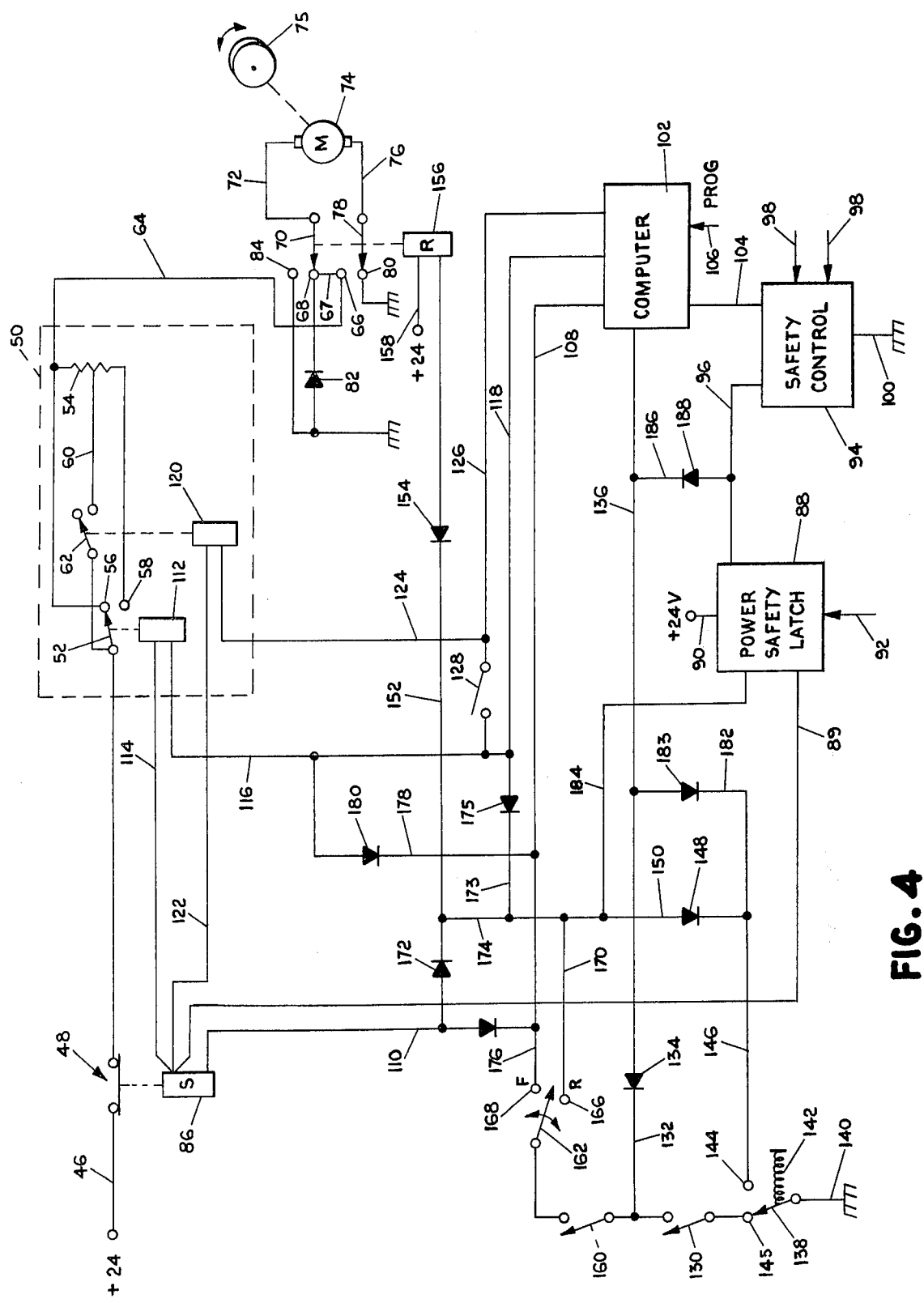
FIG. 4 is a schematic view of the electrical system for operation of the vehicle according to the invention.

Reference is now made to FIG. 4 for an explanation of the control circuit for operating the emergency reverse control according to the invention. A DC voltage common 46 is connected to a speed control circuit 50 through a safety relay 48. A speed control unit comprises a first speed control switch 52 and a voltage divider 54 connected across terminals 56 and 58 of the switch 52. A tap on the voltage divider 54 is connected to the switch 52 through lead 60 and second speed control switch 62. The power is supplied to a motor 74 through the speed control 50 and through a direction control mechanism comprised of a first reversing switch 70 and a second reversing switch 78. Reversing switch 70 has terminals 68 and 84 and the second reversing switch 78 has terminals 80 and 66. Terminal 68 is grounded through diode 82 which prevents the reversal of voltage of the terminal 68 to ground. Terminals 80 and 84 are grounded to permit the current to flow from each of these terminals to ground. Terminals 66 and 68 are connected to a lead wire 67 and a lead wire 67 and a lead 64 connects the terminal 66 with the speed control terminal 56 of the speed control mechanism 50. Lead 72 connects the switch 70 with the motor 74 and lead 76 connects the other side of the motor 74 to the second reversing switch 78. The motor 74 drives a steerable wheel 75 at a front portion of the cart.

The motor 74 is driven at full speed in a forward direction when the reversing switch is in the position illustrated in FIG. 4. Current flows through safety switch 48, through first speed control switch 52, through lead 64, terminal 66, lead 67, terminal 68, through first reversing switch 70, lead 72, through motor 74 to drive the motor in a forward direction. The current then passes through lead 76, second reversing switch 78 to terminal 80 and then to ground.

In the event that switches 70 and 78 are reversed, the switch 70 would contact terminal 84 and the switch 78 would contact terminal 66. In this condition, the current passing through lead 64 would pass through switch 78 from terminal 66 through lead 76 to turn the motor 74 in a reverse direction. The current would then flow through lead 72, switch 70 and to ground through terminal 84.

The speed control mechanism works as follows: When the first and second speed control switches 52 and 62 respectively are in the positions illustrated in FIG. 4, the motor 74 will be receiving maximum power. When switch 52 is switched to contact terminal 58, the current will flow through the entire voltage divider 54 and the power supplied to motor 74 will be significantly attenuated. In this condition, the motor will run at a relatively slow speed. An intermediate speed is provided when switch 52 is switched to contacts 58 and switch 62 is closed. In this condition, the current will pass through switch 62, lead 60 through only a portion of the voltage divider 54 and through lead 64. In this second position, an intermediate amount of power will be supplied to motor 74 so that the motor will turn at an intermediate speed.

The safety switch 48 is controlled by a safety relay 86. Power is supplied to the safety relay 86 by power safety latch 88 through lead 89. A power supply terminal 90 supplies a direct current to the power safety latch 88. So long as power is supplied from the safety latch 88 to the safety relay 86, the safety switch 48 will remain on and power is supplied to motor 74. A safety switch input 92 is provided for the power safety latch 88. The switch input 92 is connected to the bumper switch (not shown) for bumpers 42 and 43 such that when the vehicle hits an obstacle, the safety latch 88 will ground the voltage from lead 89. To this end, the safety latch 88 is connected to a safety control circuit 94 through lead 96. A lead 100 grounds the safety control 94. A lead 186 with a diode 188 connects the lead 136 to the lead 96, to connect the computer 102 with the safety control 94 so that the automatic control is disabled when the safety control circuit 94 is grounded.

Input control functions 98 are provided for stopping the vehicle when an object is sensed in front of the vehicle, but not contacted, when the vehicle is in the automatic mode. Thus, when an obstacle is sensed, the power safety latch 88 is grounded through safety control 94 and lead 96 to cut off the voltage to the safety relay 86, thereby opening safety switch 48 to stop the vehicle. At the same time, the automatic control is disabled through lead 186, lead 96 and safety control circuit 94.

A computer 102 is provided for automatically controlling the motor 74. A program is provided for the computer and inputs 106 to the computer 102 determine the speed and operation of the motor 74. The computer is connected to the safety relay 86 through leads 108 and 110 for also controlling the safety latch 86 when the vehicle is programmed to start or stop. A first speed control relay 112 controls the operation of the first speed switch 72. Power is supplied to relay 112 through lead 114 and lead 89. Relay 112 is also connected to the computer 102 through leads 116 and 118.

A second speed control relay 120 controls the second speed control switch 62. Power is supplied to the relay 120 through lead 122 and lead 89. The relay 120 is connected to the computer 102 through leads 124 and 126. A speed switch 128 is provided between leads 116 and 124 to connect the first and second speed control relays 112 and 120. The switch 128 is controlled by the speed control button 34 on the tiller handle 28 (FIG. 2).

The switch 44 is provided adjacent the door 24 to disable the automatic control when the door 24 is opened. The switch is represented schematically as switch 130 in FIG. 4. The door open switch 130 is connected to the computer 102 through lead 132, diode 134 and lead 136. The switch 130 is grounded through emergency reverse switch 138 and grounded lead 140. The computer is programmed to deactivate the automatic control of the vehicle at any time it receives a ground signal from lead 136. Thus, as the switch 130 is closed, the computer 102 will cease the automatic control function as a ground signal passes through lead 136, diode 134, lead 132, switch 130, switch 138 and ground lead 140.

The emergency reverse switch 138 is controlled by the reverse button 40 illustrated in FIG. 3. The switch 138 is biased in contact with a terminal 145 through compression spring 142. Thus, the emergency reverse switch 138 will normally be in the position illustrated in FIG. 4. A terminal 144 is also provided for switch 138. This terminal 144 is connected to the power safety latch 88 through leads 146 and 184. The power safety latch is conditioned on when it receives a ground signal from lead 184. Further, terminal 144 is connected to a reverse relay 156 through diode 148, lead 150, lead 152 and diode 154. Power is supplied to the reverse relay 156 through a power supply terminal lead 158.

The reverse relay 156 controls the position of the first and second reversing switches 70 and 78. When the reverse relay 156 is actuated, the first and second relays 70 and 78 will be actuated to reverse the direction of current flowing through motor 74. Thus, when the reverse relay 156 is actuated, the first reversing switch 70 will contact the terminal 84 and the second reversing switch 78 will contact terminal 66. Actuation of the reverse relay 156 takes place when current flows through lead 152 to a ground connection as, for example, through leads 150, 146, terminal 144, switch 138 and ground 140. Obviously, terminal 144 is not grounded unless the switch 138 is moved to contact 144. This action occurs at switch 138 only when the emergency reverse button 40 is pressed.

The lead 184 is provided or an override to the power safety latch 88. Normally, when the vehicle is stopped, such as with a safety switch input 92, lead 89 and the safety relay 86 is grounded. However, when a ground circuit is made through lead 184, lead 146, terminal 144 and switch 138, the power safety latch 88 is overridden and power is supplied to the safety relay 86 as well as to first and second speed relays 112 and 120.

A lead 182 with a diode 183 connects the lead 136 to the lead 146 to connect the computer 102 with the terminal 144. When switch 138 contacts terminal 144, the computer 102 is grounded through leads 136, 182, 146, terminal 144 and switch 138. In this manner, the reverse switch 138, when actuated, overrides the automatic control of the vehicle.

A tiller control switch 160 is connected in series with the door open switch 130. The tiller control switch 160 is an angle control switch which is open as illustrated in FIG. 4 when the tiller handle 28 is vertical and which is closed when the tiller control handle is pulled downwardly as illustrated in FIG. 2. Such angle control switches are well known and can comprise, for example, a liquid mercury switch.

A direction control switch 162 is connected in series with the tiller control switch 160 and has terminals 166 and 168. The terminal 166 is connected to the reverse relay 156 through leads 170, 174 and 152. The terminal 166 is further connected to the safety relay 86 through lead 170 through diode 172 and lead 110. In addition, the reverse terminal 166 is connected to the first speed control relay 112 through lead 116, lead 173, diode 175 and lead 170. The switch 128 provides a connection between the reverse terminal 156 and the second speed control relay 120 through diode 175 and lead 173.

The forward terminal 168 is connected to the safety relay 86 through lead 176. A lead 178 and diode 180 also connect the first speed control relay 112 to the lead 176 and forward terminal 168. The switch 128 provides a connection between the second speed control relay 120 and the forward terminal 168.

The manual control of the delivery vehicle with the tiller handle 28 will now be described. When the door 24 is opened, switch 130 is closed, thereby providing a signal to computer 102 to cease the automatic control function. When the tiller handle 28 is pulled downwardly, switch 160 closes. If it is desired to move the vehicle forward, the handle 32 is pulled outwardly, i.e., away from the vehicle, and switch 162 makes contact with the forward contact 168. The motor is thus driven forwardly at a slow speed. When the button 34 is pushed inwardly, switch 128 closes to increase the speed of the motor 74 driving wheel 75. In the event the vehicle is to be moved backwardly, the handle 32 is pushed backwardly toward the vehicle so that switch 162 makes contact with the reverse contact 166. The reverse relay 156 switches the first and second reversing switches 70 and 78 to cause the motor 74 to reverse direction in a manner which has been described above. Thus, the wheel 75 is driven rearwardly when the handle 32 is pushed toward the vehicle.

In the event that it is desired to move the vehicle rearwardly through the emergency reverse button 40, the button 42 is depressed, thereby causing switch 138 to make contact with terminal 144. Assuming that the door is open at the time, the ground connection of the controls 162 through switch 138 is terminated whereby the reversing switch 138 overrides the manual controls of the tiller handle 28. Thus, when the button 40 is pushed, the reverse relay 156 will be activated to switch the switches 70 and 78 to drive the motor 74 in a reverse direction. The override for the tiller controls prevents the vehicle from attempts to drive the vehicle in a forward and reverse direction at the same time.

In the event that the door is closed at the time the reverse button 40 is pushed, the closing of switch 138 to contact 144 will provide a ground signal to computer 102 through lead 182 and lead 146 to disable the automatic mode of computer 102. Thus, the reversing switch overrides the automatic control of the computer 102.

In the event that the vehicle has struck an obstacle which has disengaged the safety latch 88, the closing of the emergency reverse switch 138 to contact 144 will provide a ground for the safety latch 88 through line 184 to override the safety latch so that the safety latch 88 supplies power to the safety relay 86 and to the speed control relays 112 and 120. Thus, depressing of the emergency reverse button 40 overrides the power safety latch 88 so that power is supplied to the motor 74 and the depressing of the reverse button 40 drives the motor 74 in a reverse direction.

Reasonable variation and modification are possible within the scope of the foregoing disclosure, the drawings and appended claims without departing from the spirit of the invention.

The embodiments of the invention in which an exclusive property or privilege is claimed are defined as follows:

1. In a vehicle having:
   a front and a back;
   at least one steerable wheel;
   drive means for driving said vehicle along a surface;
   means coupled to the steerable wheel and to the drive means for automatically controlling the vehicle to follow a predetermined guide path;
   a door positioned at the front of the vehicle;
   manual control means positioned behind said door for manually controlling the steerable wheel and drive means while overriding said automatic control means such that said door must be opened in order to obtain access to said manual control means;
   the improvement which comprises:
   reverse control means, including a manually operable means positioned at an exterior location of said vehicle, coupled to said drive means to drive said vehicle in a reverse direction upon actuation of said manually operable means;
   whereby said vehicle can be manually driven in a reverse direction without opening of said door.

2. A vehicle according to claim 1 wherein said reverse control means includes circuit means for overriding said automatic control means.

3. A vehicle according to claim 2 wherein said manually operable means is positioned at the rear portion of said vehicle.

4. A vehicle according to claim 2 wherein said manually operable means includes a button coupled to a switch biased in an open position.

5. A vehicle according to claim 4 wherein said reverse control means include circuit means to override said manual control means.

6. A vehicle according to claim 5 wherein said manual control means comprises a tiller; means pivotably mounting said tiller on a vertical steering shaft for rotation between a vertical inoperative position and a horizontal operative position; drive control means in the tiller coupled to the drive means for manually controlling driving of the vehicle; and means coupling the vertical steering shaft to the steerable wheel for manual steering of the steerable wheel at least when the tiller is in the horizontal operable position.

7. A vehicle according to claim 6 and further comprising switch means actuatable by opening of the door, said switch means being coupled to said automatic control means to override said automatic control means when said door is opened.

8. A vehicle according to claim 2 wherein said reverse control means includes means to override said manual control means.

9. A vehicle according to claim 2 wherein said manual control means comprises a tiller, means pivotably mounting said tiller on a vertical steering shaft for rotation between a vertical inoperative position and a horizontal operative position; drive control means in the tiller coupled to the drive means for manually controlling the driving of the vehicle; and means coupling the vertical steering shaft to the steerable wheel for manual steering of the steerable wheel at least when the tiller is in the horizontal position.

10. A vehicle according to claim 2 and further comprising switch means actuatable by opening of the door, said switch means being coupled to said automatic control means to override said automatic control means when said door is opened.

11. A vehicle according to claim 1 wherein said reverse control means includes means to override said manual control means.

12. A vehicle according to claim 1 wherein said manual control means comprises a tiller; means pivotably mounting said tiller on a vertical shaft for rotation between a vertical inoperative position and a horizontal operative position; drive control means in the tiller coupled to the drive means for manually controlling the driving of the vehicle; and means coupling the vertical steering shaft to the steerable wheel for manual steering of the steerable wheel at least when the tiller is in the horizontal operative position.

13. A vehicle according to claim 1 and further comprising switch means actuatable by opening of said door, said switch means being coupled to said automatic control means to override said automatic control means when said door is opened.

14. In a vehicle having:
a front and a back;
at least one steerable wheel;
drive means for driving said vehicle along a surface;
means coupled to said steerable wheel and to said drive means for automatically controlling the vehicle to follow a predetermined guide path;
manual control means including a tiller coupled to said steerable wheel and pivotably mounted at a front of said vehicle between a vertical inoperative position and a horizontal operative position;
drive control means mounted on the tiller and coupled to the guide means for manually controlling the driving of the vehicle;
switch means coupling said drive control means to said drive means, said switch means having actuation means coupled to said tiller such that said switch is open when said tiller is vertically positioned and is actuated to close when said tiller is pulled downwardly to the horizontal position;
said manual control means further including means for overriding said automatic control means;
the improvement which comprises:
reverse control means, including a manually operable means positioned at an exterior location of said vehicle, coupled to said drive means to drive said vehicle in a reverse direction upon actuation of said manually operable means and means for overriding said automatic control means upon actuation of said manually operable means;
whereby said vehicle can be manually driven n a reverse direction without pulling said tiller handle to the horizontal position.

15. A vehicle according to claim 14 wherein said manually operable means is positioned at the rear portion of said vehicle.

16. A vehicle according to claim 14 wherein said manually operable means includes a button coupled to a switch biased in an open position.

17. A vehicle according to claim 14 wherein said reverse control means includes means to override said manual control means.

18. In a vehicle having:
a front and a back:
at least one steerable wheel;
drive means for driving said vehicle along a surface;
means coupled to said steerable wheel and to said drive means for automatically controlling the vehicle to follow a predetermined guide path;
manual control means including a tiller coupled to said steerable wheel and pivotably mounted at a front of said vehicle between a vertical inoperative position and a horizontal operative position;
drive control means mounted on the tiller and coupled to the guide means for manually controlling the driving of the vehicle;
switch means coupling said drive control means to said drive means, said switch means having actuation means coupled to said tiller such that said switch is open when said tiller is vertically positioned and is actuated to close when said tiller is pulled downwardly to the horizontal position;
said manual control means further including means for overriding said automatic control means;
an abutment detecting means at the front of said vehicle for detecting and presence of an obstacle in front of the vehicle; and
circuit means coupling said abutment detecting means to said automatic control means for disabling said automatic control means and said drive means when an abutment is detected by said abutment detecting means;
the improvement which comprises:
reverse control means, including a manually operable means positioned at an exterior location of said vehicle, coupled to said drive means to drive said vehicle in a reverse direction upon actuation of said manually operable means; and
means, coupled to said reverse control means, for overriding said abutment detecting circuit means to the extent that it disables said drive means when said reverse control means manually operable means is actuated.

* * * * *